(12) United States Patent
Kum et al.

(10) Patent No.: US 9,529,221 B2
(45) Date of Patent: Dec. 27, 2016

(54) DISPLAY DEVICE AND MANUFACTURING METHOD THEREOF

(71) Applicant: SAMSUNG DISPLAY CO., LTD., Yongin, Gyeonggi-Do (KR)

(72) Inventors: Byung-Gon Kum, Suwon-si (KR); Choi Sang Park, Suwon-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 91 days.

(21) Appl. No.: 14/667,840

(22) Filed: Mar. 25, 2015

(65) Prior Publication Data

US 2016/0091749 A1 Mar. 31, 2016

(30) Foreign Application Priority Data

Sep. 29, 2014 (KR) ......................... 10-2014-0130559

(51) Int. Cl.
*G02F 1/1341* (2006.01)
*G02F 1/1333* (2006.01)

(52) U.S. Cl.
CPC ....... *G02F 1/133377* (2013.01); *G02F 1/1341* (2013.01)

(58) Field of Classification Search
CPC . G02F 1/1341; G02F 1/133377; G02F 1/1368
See application file for complete search history.

(56) References Cited

U.S. PATENT DOCUMENTS

2014/0009709 A1* 1/2014 Lim .................. G02F 1/136286
349/43

FOREIGN PATENT DOCUMENTS

KR 1020140065271 5/2014
KR 1020140071550 6/2014

* cited by examiner

*Primary Examiner* — Timothy L Rude
(74) *Attorney, Agent, or Firm* — F. Chau & Associates, LLC

(57) ABSTRACT

A liquid crystal display includes a substrate, a thin film transistor disposed on the substrate, a pixel electrode disposed on and connected to the thin film transistor, and a liquid crystal layer disposed in a first microcavity. The first microcavity is disposed on the pixel electrode and includes an injection hole. The liquid crystal display further includes a roof layer disposed on the first microcavity, an injection hole formation region disposed between the first microcavity and a second microcavity adjacent to the first microcavity, and a liquid crystal transmission layer disposed in the injection hole formation region.

20 Claims, 16 Drawing Sheets

DISPLAY DEVICE AND MANUFACTURING METHOD THEREOF

CROSS-REFERENCE TO RELATED APPLICATIONS

This application claims priority under 35 U.S.C. §119 to Korean Patent Application No. 10-2014-0130559 filed on Sep. 29, 2014, the disclosure of which is incorporated by reference herein in its entirety.

TECHNICAL FIELD

Exemplary embodiments of the present invention relate to a display device and a manufacturing method thereof.

DISCUSSION OF THE RELATED ART

A liquid crystal display (LCD) is one of the most common types of flat panel displays currently in use. The liquid crystal display includes a liquid crystal display panel in which a liquid crystal layer is formed between a lower panel and an upper panel. A voltage is applied to a pixel electrode and a common electrode of the liquid crystal panel to generate an electric field such that an arrangement of liquid crystal molecules of the liquid crystal layer is realigned and the polarization of incident light is controlled, thereby displaying images.

The lower panel may include thin film transistors arranged thereon and the upper panel faces the lower panel. Referring to the lower panel, a gate line transmitting a gate signal, a data line transmitting a data signal, a thin film transistor connected to the gate line and the data line, and a pixel electrode connected to the thin film transistor are formed. Referring to the upper substrate, a light blocking member, a color filter, and a common electrode may be formed, and at least one of these components may be formed on the lower panel.

SUMMARY

Exemplary embodiments of the present invention provide a liquid crystal display having reduced contamination of a liquid crystal injected into a microcavity, and a manufacturing method thereof.

According to an exemplary embodiment of the present invention, a liquid crystal display includes a substrate with a thin film transistor positioned thereon, a pixel electrode positioned on the thin film transistor and connected thereto, a liquid crystal layer positioned in a microcavity positioned on the pixel electrode and having an injection hole, a roof layer positioned on the microcavity, an injection hole formation region positioned between adjacent microcavities, and a liquid crystal transmission layer positioned at the injection hole formation region.

A capping layer positioned on the liquid crystal transmission layer may be further included.

The liquid crystal transmission layer may include nanoparticles with gaps between the nanoparticles.

The liquid crystal transmission layer may have a gap ratio in a range from about 26% to about 48%.

The liquid crystal transmission layer may be formed to be higher than the microcavity.

The liquid crystal transmission layer may be formed with a height corresponding to an upper portion of the roof layer.

The liquid crystal transmission layer may include pores.

The liquid crystal transmission layer may include a silicon oxide and/or a zinc oxide.

A common electrode forming an electric field along with the pixel electrode may be further included.

According to an exemplary embodiment of the present invention, a method of manufacturing a liquid crystal display includes forming a thin film transistor on a substrate, forming a pixel electrode connected to the thin film transistor, forming a sacrificial layer on the pixel electrode, forming a roof layer exposing the sacrificial layer of a liquid crystal injection hole formation region on the sacrificial layer, removing the sacrificial layer to form a microcavity having an injection hole, forming a liquid crystal transmission layer at the injection hole formation region between adjacent microcavities, and injecting a liquid crystal through the liquid crystal transmission layer and the injection hole to form a liquid crystal layer in the microcavity.

The method may further include forming a capping layer on the liquid crystal transmission layer after forming the liquid crystal layer.

The forming of the liquid crystal transmission layer may include coating a paste including nanoparticles at the injection hole formation region.

The forming of the liquid crystal transmission layer may include hardening the paste after coating the paste.

The forming of the liquid crystal transmission layer may include coating a mixture of thermally decomposable or dissolvable particles and a transparent oxide to the injection hole formation region.

The forming of the liquid crystal transmission layer may include thermally decomposing or dissolving the particles after coating the mixture.

The injection of the liquid crystal may be performed using a vacuum filling process.

The method may further include forming an alignment layer at an inner surface of the microcavity before forming the liquid crystal transmission layer.

The liquid crystal transmission layer may be formed with a height corresponding to an upper portion of the roof layer.

According to an exemplary embodiment of the present invention, a liquid crystal display includes a substrate, a thin film transistor disposed on the substrate, a pixel electrode disposed on and connected to the thin film transistor, and a liquid crystal layer disposed in a first microcavity. The first microcavity is disposed on the pixel electrode and includes an injection hole. The liquid crystal display further includes a roof layer disposed on the first microcavity, an injection hole formation region disposed between the first microcavity and a second microcavity adjacent to the first microcavity, and a liquid crystal transmission layer disposed in the injection hole formation region.

According to an exemplary embodiment of the present invention, a method of manufacturing a liquid crystal display includes forming a thin film transistor on a substrate, forming a pixel electrode connected to the thin film transistor, forming a sacrificial layer on the pixel electrode, and forming a roof layer on the sacrificial layer. The roof layer exposes the sacrificial layer in an area corresponding to an injection hole formation region. The method further includes removing the sacrificial layer to form a first microcavity having an injection hole, forming a liquid crystal transmission layer in the injection hole formation region between the first microcavity and a second microcavity adjacent to the first microcavity, and injecting a liquid crystal through the liquid crystal transmission layer and the injection hole to form a liquid crystal layer in the first microcavity.

According to an exemplary embodiment of the present invention, a method of manufacturing a liquid crystal display includes forming a thin film transistor on a substrate, forming a pixel electrode connected to the thin film transistor, forming a first microcavity having an injection hole on the pixel electrode, forming a liquid crystal transmission layer in an area between the first microcavity and a second microcavity adjacent to the first microcavity, and injecting a liquid crystal through the liquid crystal transmission layer and the injection hole to form a liquid crystal layer in the first microcavity.

According to exemplary embodiments the present invention, the capping layer or the formation material thereof does not contact the liquid crystal. As a result, liquid crystal contamination due to the capping layer may be prevented or reduced, and the range of the material selection of the capping layer is widened. Further, according to exemplary embodiments, even if the liquid crystal remains at the injection hole formation region between the microcavities, the liquid crystal is not contaminated by the capping layer, the requirement of quantification of the liquid crystal amount is reduced, and it is not required to remove the remaining liquid crystal at the injection hole formation region.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Figure 1:
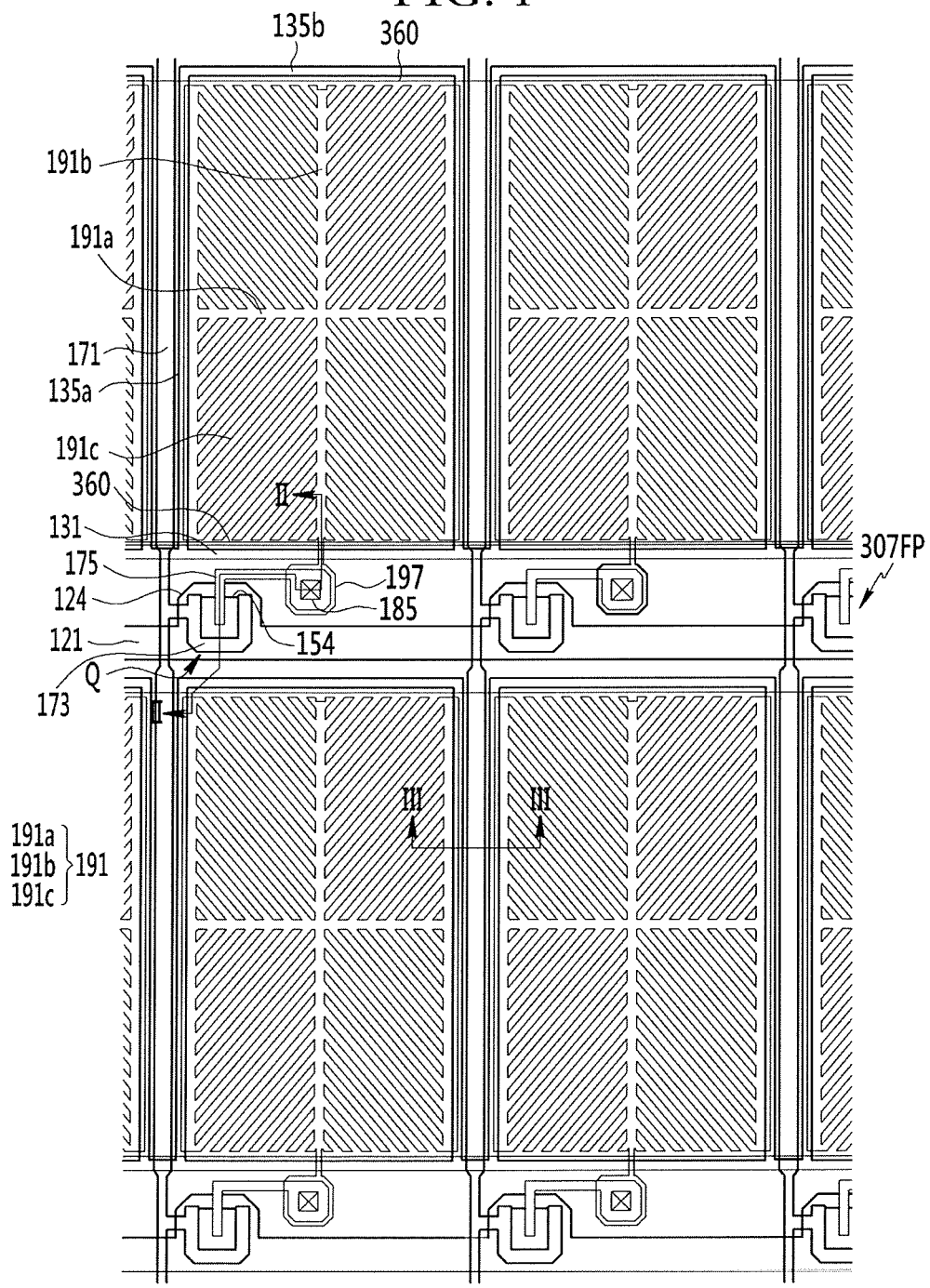
FIG. 1 is a plan view of a display device according to an exemplary embodiment of the present invention.

Exemplary embodiments of the present invention will be described more fully hereinafter with reference to the accompanying drawings. Like reference numerals may refer to like elements throughout the accompanying drawings.

In the drawings, the thickness of layers, films, panels, regions, etc., may be exaggerated for clarity. It will be understood that when an element such as a layer, film, region, or substrate is referred to as being "on" another element, it can be directly on the other element or intervening elements may also be present.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. In addition, it will also be understood that when a layer is referred to as being "between" two layers, it can be the only layer between the two layers, or one or more intervening layers may also be present.

It will be understood that the terms "first," "second," "third," etc. are used herein to distinguish one element from another, and the elements are not limited by these terms. Thus, a "first" element in an exemplary embodiment may be described as a "second" element in another exemplary embodiment. Further, it is to be understood that while parameters may be described herein as having "about" a certain value, according to exemplary embodiments, the parameter may be exactly the certain value or approximately the certain value.

Hereinafter, a liquid crystal display according to exemplary embodiments of the present invention will be described with reference to the accompanying drawings.

Figure 2:
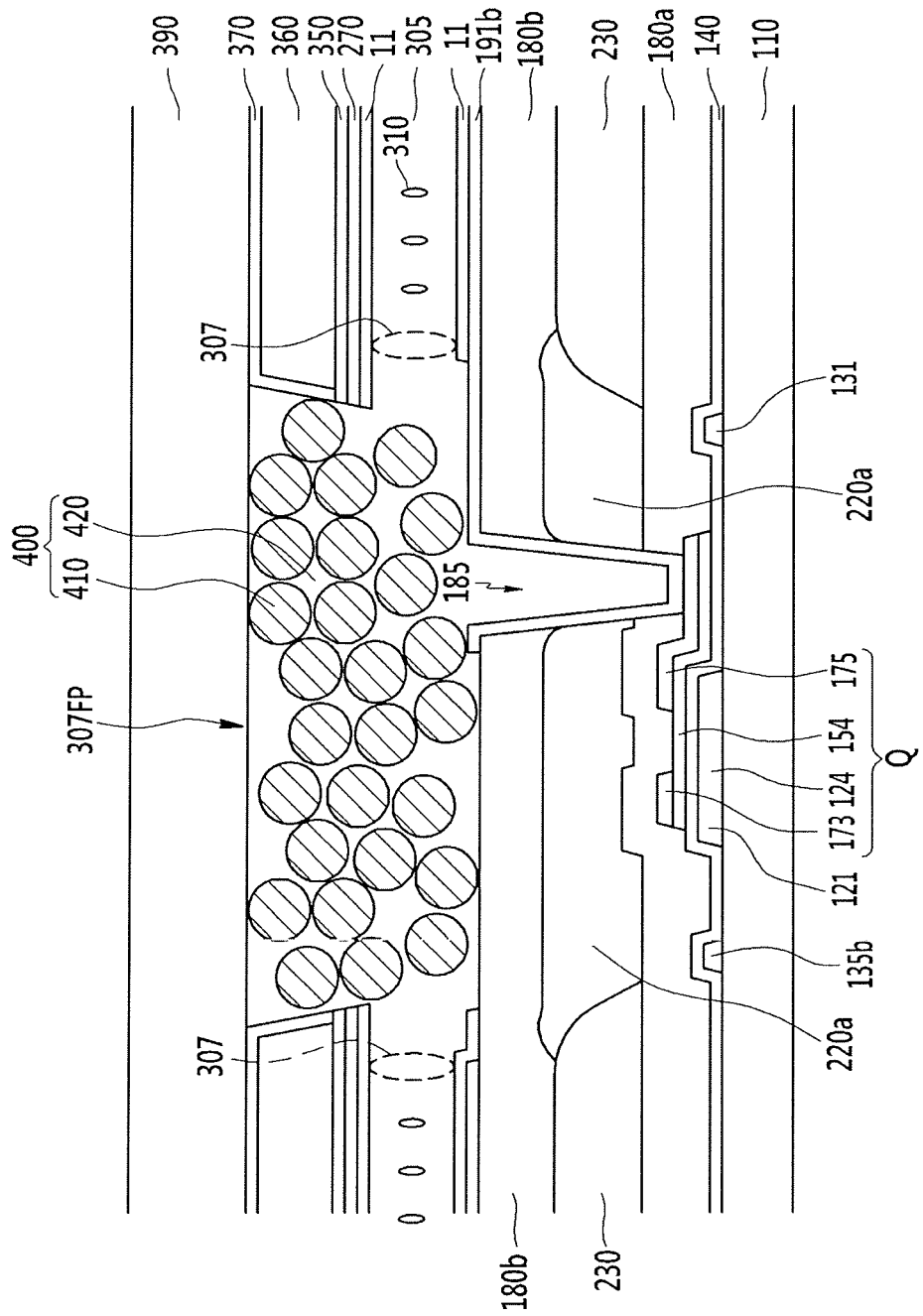
FIG. 2 is a cross-sectional view taken along line II-II of FIG. 1 according to an exemplary embodiment of the present invention.
Figure 3:
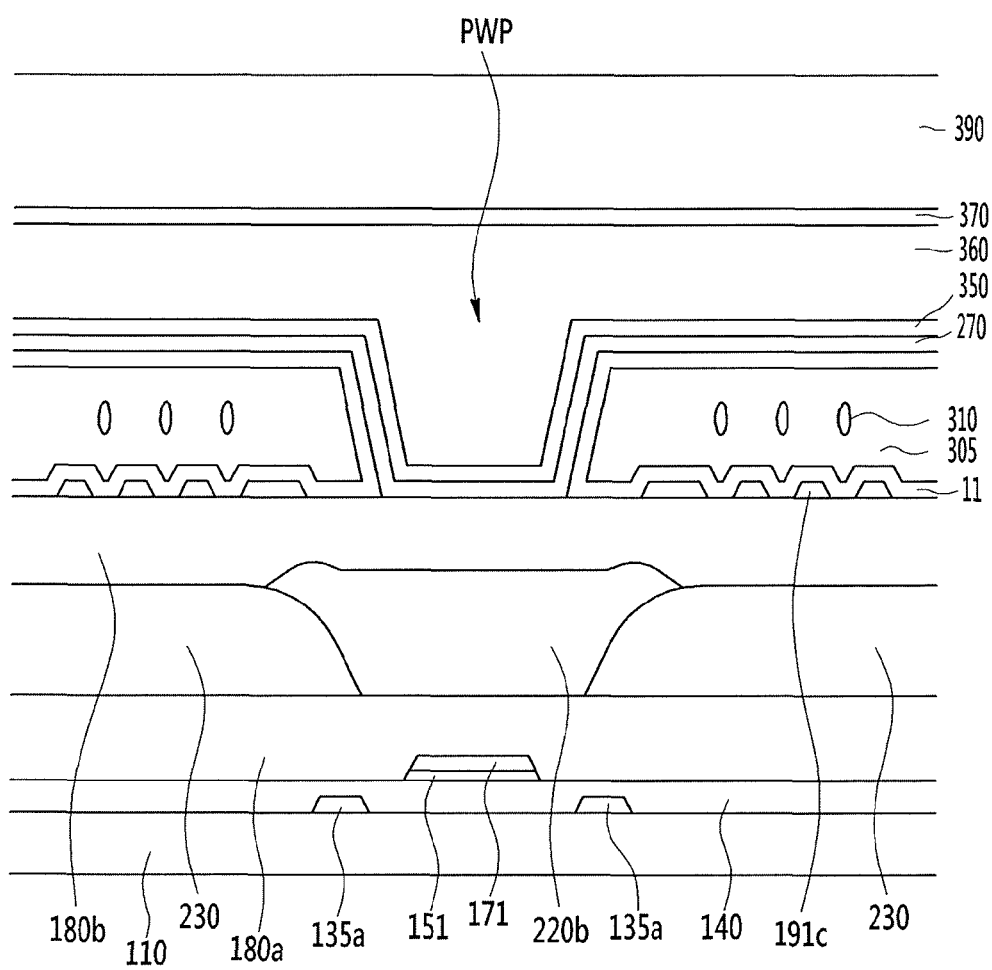
FIG. 3 is a cross-sectional view taken along line III-III of FIG. 1 according to an exemplary embodiment of the present invention.

FIG. 1 is a plan view of a display device according to an exemplary embodiment of the present invention. FIG. 2 is a cross-sectional view taken along line II-II of FIG. 1 according to an exemplary embodiment of the present invention. FIG. 3 is a cross-sectional view taken along line of FIG. 1 according to an exemplary embodiment of the present invention.

FIG. 1 illustrates four adjacent pixel areas from among a plurality of pixels arranged in a matrix shape.

Referring to FIGS. 1 to 3, a gate conductor including a gate line 121 and a storage electrode line 131 is formed on a substrate 110. The substrate 110 may be made of a transparent insulator such as, for example, glass or plastic.

The gate line 121 substantially extends in a horizontal direction and transmits a gate signal. The gate line 121 includes a gate electrode 124 protruding from the gate line 121. The manner in which the gate electrode 124 protrudes may be modified. For example, the size, shape, location, etc. of the protruding gate electrode 124 may vary according to exemplary embodiments of the present invention.

The storage electrode line 131 substantially extends in a horizontal direction and transmits a predetermined voltage such as, for example, a common voltage Vcom. The storage electrode line 131 includes a pair of vertical portions 135a extending to be substantially vertical to the gate line 121, and a horizontal portion 135b connecting ends of the pair of vertical portions 135a. The vertical portions 135a and the horizontal portion 135b of the storage electrode line 131 may substantially surround a pixel electrode 191.

A gate insulating layer 140 is formed on the gate line 121 and the storage electrode line 131. The gate insulating layer 140 may be made of an inorganic insulating material such as, for example, a silicon nitride (SiNx) or a silicon oxide (SiOx). The gate insulating layer 140 may be formed as a single layer or a multilayer.

A semiconductor 151 positioned below a data line 171, and a semiconductor 154 positioned below source/drain electrodes and at a channel portion of a thin film transistor Q, are formed on the gate insulating layer 140. The semiconductors 151 and 154 may be made of, for example, amorphous silicon, polycrystalline silicon, a metal oxide, etc.

An ohmic contact may be formed among the semiconductors 151 and 154, the data line 171, and the source/drain electrodes. The ohmic contact may be made of a silicide or a material such as, for example, n+ hydrogenated amorphous silicon in which an n-type impurity is doped at a high concentration. However, the ohmic contact is not limited thereto.

A data conductor including a source electrode 173, a drain electrode 175, and the data line 171 connected with the source electrode 173 is formed on the semiconductors 151 and 154 and the gate insulating layer 140.

The data line 171 transmits a data signal and substantially extends in a vertical direction to cross the gate line 121. The source electrode 173 and the drain electrode 175 form the thin film transistor Q together with the gate electrode 124 and the semiconductor 154, and a channel of the thin film transistor Q is formed in the semiconductor 154 between the source electrode 173 and the drain electrode 175.

A first interlayer insulating layer 180a is formed on the data conductor (e.g., the data line 171, the source electrode 173, and the drain electrode 175) and an exposed portion of the semiconductor 154. The first interlayer insulating layer 180a may include an inorganic insulator such as, for example, a silicon nitride (SiOx) or a silicon oxide (SiOx), or an organic insulator.

A color filter 230 and a light blocking member (220a and 220b) are formed on the first interlayer insulating layer 180a.

The color filter 230 may display primary colors. For example, the color filter 230 may display the three primary colors red, green, and blue. However, the color filter 230 is not limited to the three primary colors red, green, and blue. For example, the color filter 230 may display one of cyan, magenta, yellow, and white-based colors. The color filter 230 may be made of a material displaying different colors for every adjacent pixel.

The light blocking member (220a and 220b) is formed in a lattice structure having openings corresponding to an area displaying the image, and is made of a material through which light does not pass. The light blocking member (220a and 220b) includes a horizontal light blocking member 220a formed in a direction substantially parallel to the gate line 121, and a vertical light blocking member 220b formed in a direction substantially parallel to the data line 171. Herein, the horizontal light blocking member 220a and the vertical light blocking member 220b may be collectively referred to as the light blocking member 220. Further, the horizontal light blocking member 220a may also be referred to as a transverse light blocking member 220a, and the vertical light blocking member 220b may also be referred to as a longitudinal light blocking member 220b. The light blocking member (220a and 220b) may be formed on an upper insulating layer 370, which is further described below.

A second interlayer insulating layer 180b covering the color filter 230 and the light blocking member 220 is formed on the color filter 230 and the light blocking member 220. The second interlayer insulating layer 180b may include an inorganic insulator such as, for example, a silicon nitride (SiNx) or a silicon oxide (SiOx), or an organic insulator. When a step is generated due to a thickness difference between the color filter 230 and the light blocking member 220, the second insulating layer 180b may include the organic insulator to reduce or eliminate the step.

A contact hole 185 exposing the drain electrode 175 is formed in the light blocking member 220 and the interlayer insulating layers 180a and 180b.

The pixel electrode 191 is formed on the second interlayer insulating layer 180b. The pixel electrode 191 may be made of a transparent conductive material such as, for example, indium tin oxide (ITO) or indium zinc oxide (IZO).

An overall shape of the pixel electrode 191 may be, for example, a quadrangle. The pixel electrode 191 may include, for example, a cross stem including a horizontal stem 191a and a vertical stem 191b crossing the horizontal stem 191a. The pixel electrode 191 may be divided into four subregions by the horizontal stem 191a and the vertical stem 191b, and each subregion may include a plurality of minute branches 191c. In an exemplary embodiment, the pixel electrode 191 may further include an outer stem surrounding the outside of the pixel electrode 191.

The minute branches 191c of the pixel electrode 191 may form an angle of about 40° to about 45° with the gate line 121 or the horizontal stem 191a. The minute branches 191c of two adjacent subregions may be orthogonal to each other. According to exemplary embodiments, a width of the minute branches 191c may be gradually increased, and a distance between the minute branches 191 c may vary.

The pixel electrode 191 includes an extension 197 which is connected to a lower end of the vertical stem 191b and has a larger area than the vertical stem 191b. The pixel electrode 191 is physically and electrically connected to the drain electrode 175 through the contact hole 185 in the extension 197, and receives a data voltage from the drain electrode 175.

It is to be understood that the foregoing description of the thin film transistor Q and the pixel electrode 191 is exemplary, and a structure of the thin film transistor Q and a design of the pixel electrode 191 may be modified to, for example, improve side visibility, according to exemplary embodiments of the present invention.

An alignment layer 11 is formed on the pixel electrode 191 and under the common electrode 270. The alignment layer 11 may be, for example, a vertical alignment layer. The alignment layer 11 may include at least one of materials typically used as a liquid crystal alignment layer such as, for example, polyamic acid, polysiloxane, or polyimide. The alignment layer 11 may be, for example, a photo-alignment layer.

A microcavity 305 defined by the alignment layer 11 is formed between the pixel electrode 191 and the common electrode 270. The microcavity 305 is a space generated, for example, while forming and removing a sacrificial layer, which is described further below. The microcavity 305 may be formed in one pixel area, and may be formed over two adjacent pixel areas. The microcavity 305 has an injection hole 307 for injection of a liquid crystal layer containing liquid crystal molecules 310. The liquid crystal layer made of a liquid crystal is formed inside the microcavity 305. The liquid crystal may be injected into the microcavity 305 through the injection hole 307 using, for example, capillary force. An alignment material forming the alignment layer 11 may also be injected into the microcavity 305 through the injection hole 307 before injecting the liquid crystal.

In FIGS. 1 to 3, the liquid crystal is not shown in an injection hole formation region 307FP (which may also be referred to as a trench) between adjacent microcavities 305, however, the liquid crystal that is not injected into the microcavities 305 may remain at the injection hole formation region 307FP. In FIGS. 1 to 3, the injection hole 307 is respectively formed at the facing edges of the microcavities 305 adjacent in the vertical direction, however, the injection hole 307 may be formed at only one edge from among the two facing edges.

A plurality of microcavities 305 are formed in a matrix shape. These microcavities 305 are divided in the horizontal direction by a partition formation portion PWP, which is described further below, and are divided in the vertical direction by the injection hole formation region 307FP positioned to overlap the gate line 121. Each microcavity 305 may correspond to one or more pixel areas.

The common electrode 270 and a lower insulating layer 350 are sequentially positioned on the alignment layer 11. The common electrode 270 receives a common voltage and generates an electric field together with the pixel electrode 191, to which the data voltage is applied, to determine tilt directions of the liquid crystal molecules 310 positioned in the microcavity 305 between the two electrodes. The common electrode 270 forms a capacitor together with the pixel electrode 191 to maintain the applied voltage even after the thin film transistor Q is turned off. The lower insulating layer 350 may be formed of, for example, a silicon nitride (SiNx) or a silicon oxide (SiOx).

In the exemplary embodiment described herein, the common electrode 270 is formed on the microcavity 305. However, according to exemplary embodiments, the common electrode 270 may be formed under the microcavity 305, allowing for liquid crystal driving according to a coplanar electrode (CE) mode.

A roof layer 360 is positioned on the lower insulating layer 350. The roof layer 360 supports the microcavity 305, which is a space between the pixel electrode 191 and the common electrode 270 to be formed. The roof layer 360 may include, for example, a photoresist or other organic materials.

The upper insulating layer 370 is positioned on the roof layer 360. The upper insulating layer 370 may contact an upper surface of the roof layer 360. The upper insulating layer 370 may be made of an inorganic insulating material such as, for example, a silicon nitride (SiNx) or a silicon oxide (SiOx). The upper insulating layer 370 protects the roof layer 360 (e.g., when the roof layer 360 is made of an organic material), and may be omitted in exemplary embodiments.

A liquid crystal transmission layer 400 is formed in the injection hole formation region 307FP in an area corresponding to the space between the two microcavities 305 adjacent in the vertical direction. The liquid crystal transmission layer 400 may be formed in a position corresponding to the approximate top portion of the roof layer 360 (e.g., an upper portion/surface of the liquid crystal transmission layer 400 may be substantially aligned with an upper portion/surface of the roof layer 360). However, exemplary embodiments are not limited thereto. For example, in exemplary embodiments, the liquid crystal transmission layer 400 may be higher or lower than the approximate top portion of the roof layer 360. According to an exemplary embodiment, forming the liquid crystal transmission layer 400 to be higher than the microcavity 305 allows for a capping layer 390 or a formation material thereof to be prevented from contacting the liquid crystal. Thus, in exemplary embodiments, a height of the liquid crystal transmission layer 400 is greater than a height of the microcavity 305.

The liquid crystal transmission layer 400 includes nanoparticles 410 with gaps 420 existing therebetween. Each nanoparticle 410 may have a size of, for example, less than several tens of micrometers. The size of the nanoparticles 410 may be limited to a width of the injection hole formation region 307FP (e.g., corresponding to an interval of two microcavities 305 adjacent in the vertical direction). For example, when the width of the injection hole formation region 307FP is about 50 μm, the nanoparticles 410 may have a diameter of less than about 50 μm. The liquid crystal forming the liquid crystal layer in the microcavity 305 is filled into the microcavity through the injection hole 307 after passing through the gaps 420 in the liquid crystal transmission layer 400.

The capping layer 390 is formed on the upper insulating layer 370 and the liquid crystal transmission layer 400. Generally, the capping layer 390 is formed to cover the injection hole formation region 307FP connected to the liquid crystal injection hole 307 of the microcavity 305. In this case, the capping layer contacts the remaining liquid crystal of the injection hole 307 or the injection hole formation region 307FP, and as a result, the liquid crystal may be contaminated and the display quality may be deteriorated. However, according to exemplary embodiments of the present invention, the capping layer 390 is substantially formed on the liquid crystal transmission layer 400 such that the capping layer 390 does not contact the liquid crystal. Accordingly, according to exemplary embodiments, it is not required that the capping layer 390 be formed of a material that does not react with the liquid crystal such as, for example, parylene.

The capping layer 390 may be a multilayer such as, for example, a dual layer or a triple layer. The dual layer may be made of two layers formed of different materials. The triple layer may be made of three layers, and the materials that form the adjacent layers may be different from each other. For example, the capping layer 390 may include a layer made of the organic insulating material and a layer made of the inorganic insulating material.

According to exemplary embodiments, a polarizer may be further formed on upper and lower surfaces of the display device. The polarizer may include, for example, a first polarizer adhered to a lower surface of the substrate 110 and a second polarizer adhered to the capping layer 390.

As shown in FIG. 3, a partition formation portion PWP is positioned between the microcavities 305 adjacent to each other in the transverse direction. The partition formation portion PWP may be formed in an extending direction of the data line 171, and may be covered by the roof layer 360. The lower insulating layer 350, the common electrode 270, the upper insulating layer 370, and the roof layer 360 are filled in the partition formation portion PWP, and the structure forms the partition wall to partition or define the microcavity 305. According to exemplary embodiments, if the partition structure (e.g., the partition formation portion PWP) exists between the microcavities 305, even if the insulation substrate 110 is bent, the amount of stress generated may be small, and a change degree of a cell gap may be reduced.

A method of manufacturing the display device described above with reference to FIGS. 1 to 3 according to an exemplary embodiment of the present invention will be described with reference to FIGS. 4 to 15.

FIGS. 4 to 15 are cross-sectional views showing a manufacturing method of a display device according to an exemplary embodiment of the present invention. FIGS. 4, 6, 8, 10, 11, 13, and 14 sequentially show cross-sectional views taken along line II-II of FIG. 1. FIGS. 5, 7, 9, 12, and 15 sequentially show cross-sectional views taken along line III-III of FIG. 1.

Figure 4:
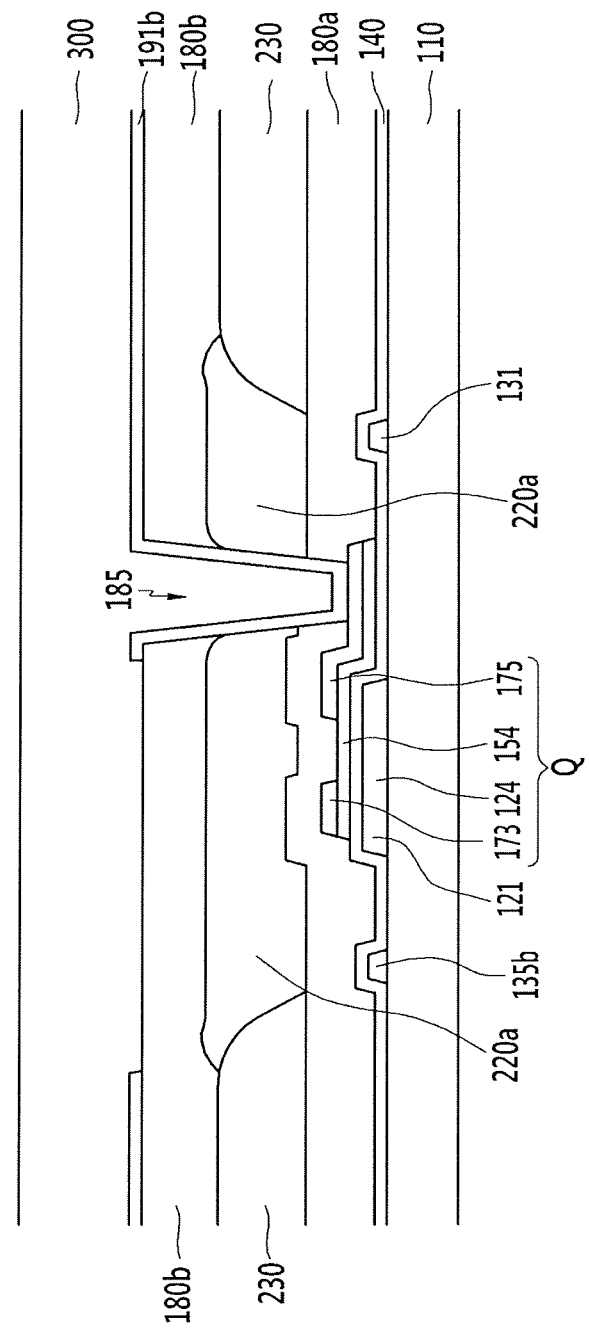
FIGS. 4 to 15 are cross-sectional views showing a manufacturing method of a display device according to an exemplary embodiment of the present invention.
Figure 5:
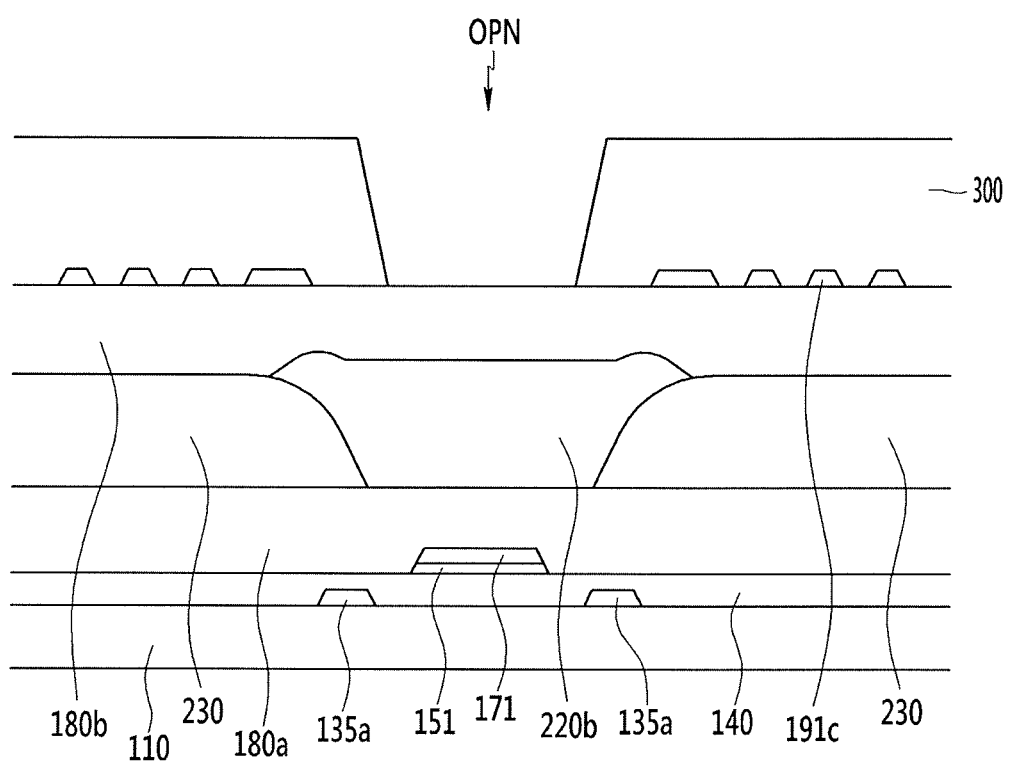

Referring to FIGS. 1, 4 and 5, in order to form a switching element on a substrate 110, the gate line 121 extending in the horizontal direction is formed, the gate insulating layer 140 is formed on the gate line 121, the semiconductor layers 151 and 154 are formed on the gate insulating layer 140, and the source electrode 173 and the drain electrode 175 are formed. In this case, the data line 171 connected with the source electrode 173 may be formed to extend in the vertical direction while crossing the gate line 121. The storage electrode line 131 may also be formed when forming the gate line 121.

The first interlayer insulating layer 180a is formed on the data conductors 171, 173, and 175 including the source electrode 173, the drain electrode 175, and the data line 171, and the exposed portion of the semiconductor layer 154.

The color filter 230 is formed at a position corresponding to the pixel area on the first interlayer insulating layer 180a, and the light blocking member 220 is formed between the color filters 230. The light blocking member 220 includes the transverse light blocking member 220a formed in a direction substantially parallel to the gate line 121 and the longitudinal light blocking member 220b formed in a direction substantially parallel to the data line 171.

The second interlayer insulating layer 180b covering the color filter 230 and the light blocking member 220 is formed thereon. The transverse light blocking member 220a and the second interlayer insulating layer 180b have the contact hole 185 physically and electrically connecting the pixel electrode 191 and the drain electrode 175.

Next, the pixel electrode 191 is formed on the second interlayer insulating layer 180b, and a sacrificial layer 300 is formed on the pixel electrode 191. The pixel electrode 191 may be formed by depositing and patterning a transparent conductive material such as, for example, indium tin oxide (ITO) or indium zinc oxide (IZO). The sacrificial layer 300 may be formed by coating a photosensitive organic material on the pixel electrode 191 and applying a photolithography process. As shown in FIG. 5, an opening OPN is formed on the sacrificial layer 300 in a direction substantially parallel with the data line 171. In a subsequent process, the common electrode 270, the lower insulating layer 350, the roof layer 360, and the upper insulating layer 370 are filled in the opening OPN to form the partition formation portion PWP.

Figure 6:
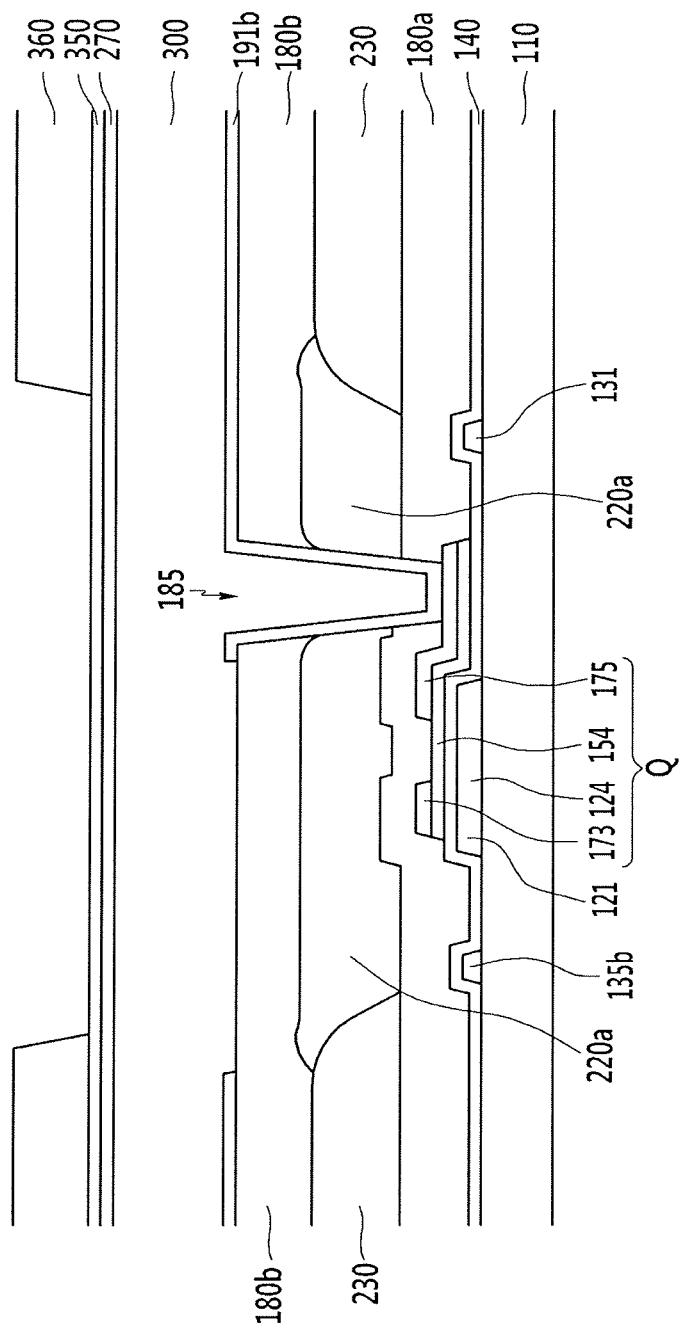
Figure 7:
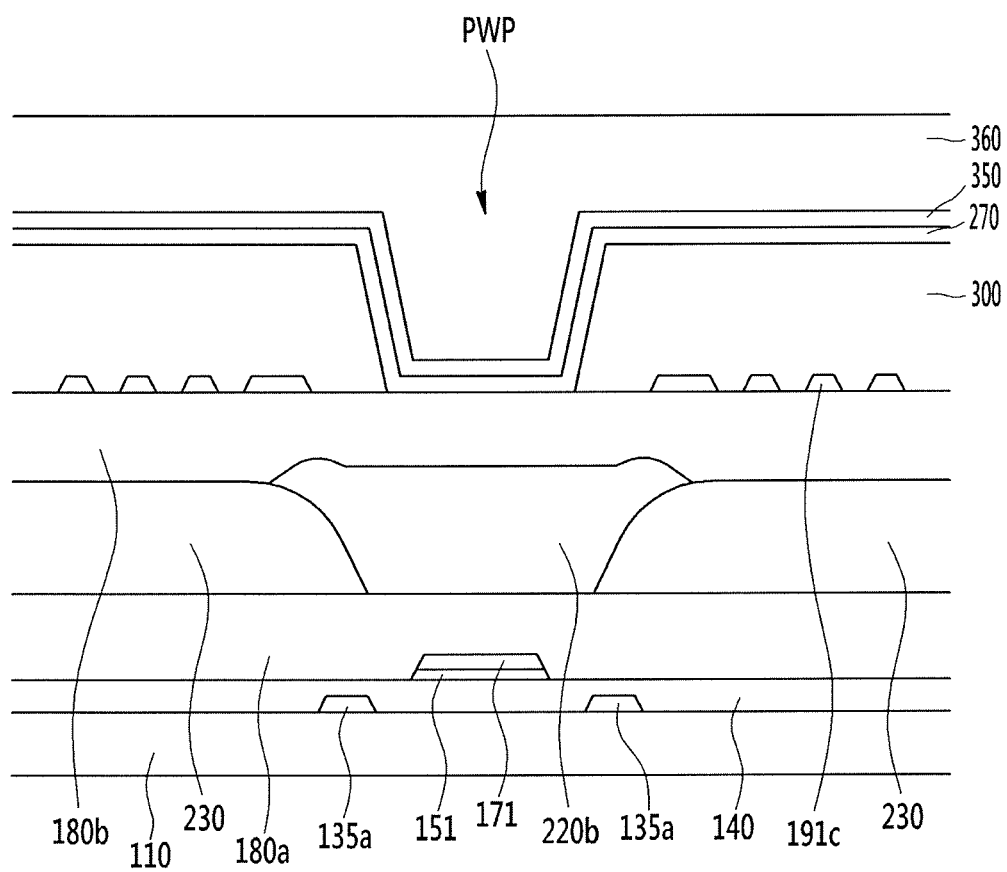

Referring to FIGS. 6 and 7, the common electrode 270, the lower insulating layer 350, and the roof layer 360 are sequentially formed on the sacrificial layer 300. The roof layer 360 may be removed at the region corresponding to the light blocking member 220 positioned between the pixel areas adjacent in the vertical direction by, for example, an exposure and development process. The roof layer 360 exposes the lower insulating layer 350 in the region corresponding to the light blocking member 220. In this case, the common electrode 270, the lower insulating layer 350, and the roof layer 360 fill the opening OPN of the longitudinal light blocking member 220b, thereby forming the partition formation portion PWP.

Figure 8:
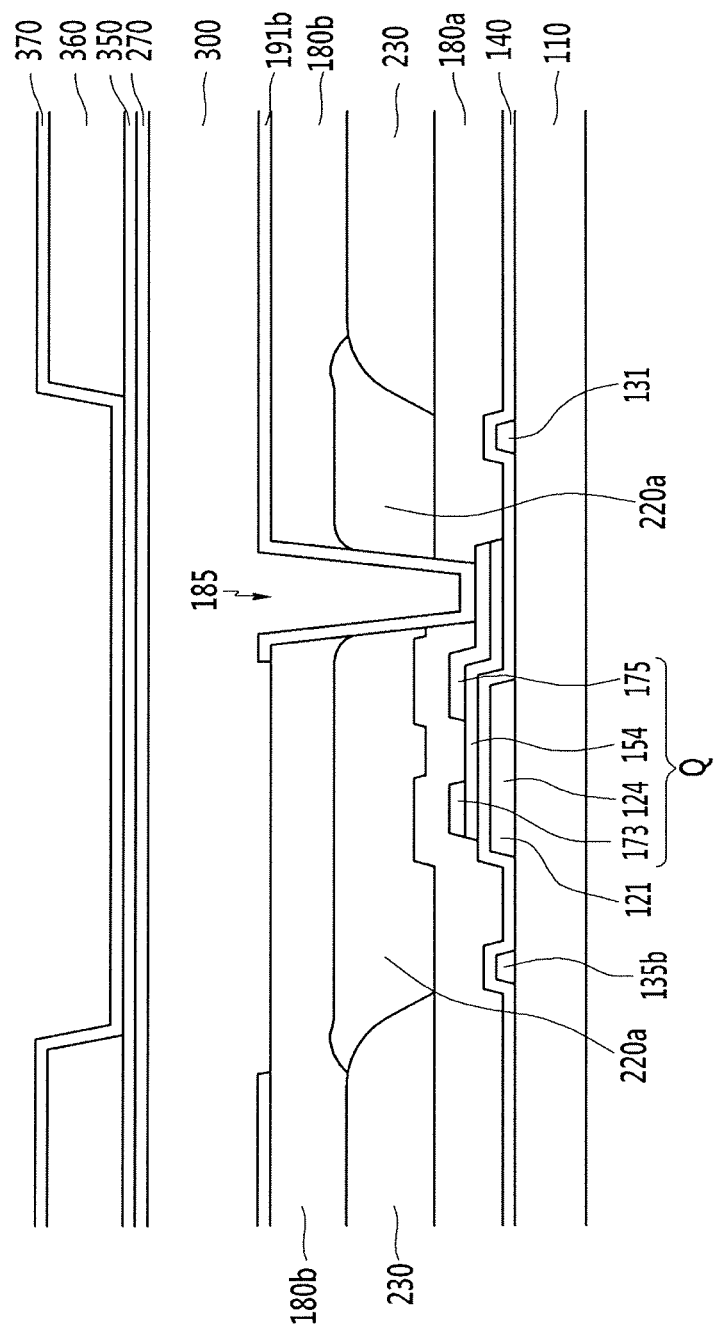
Figure 9:
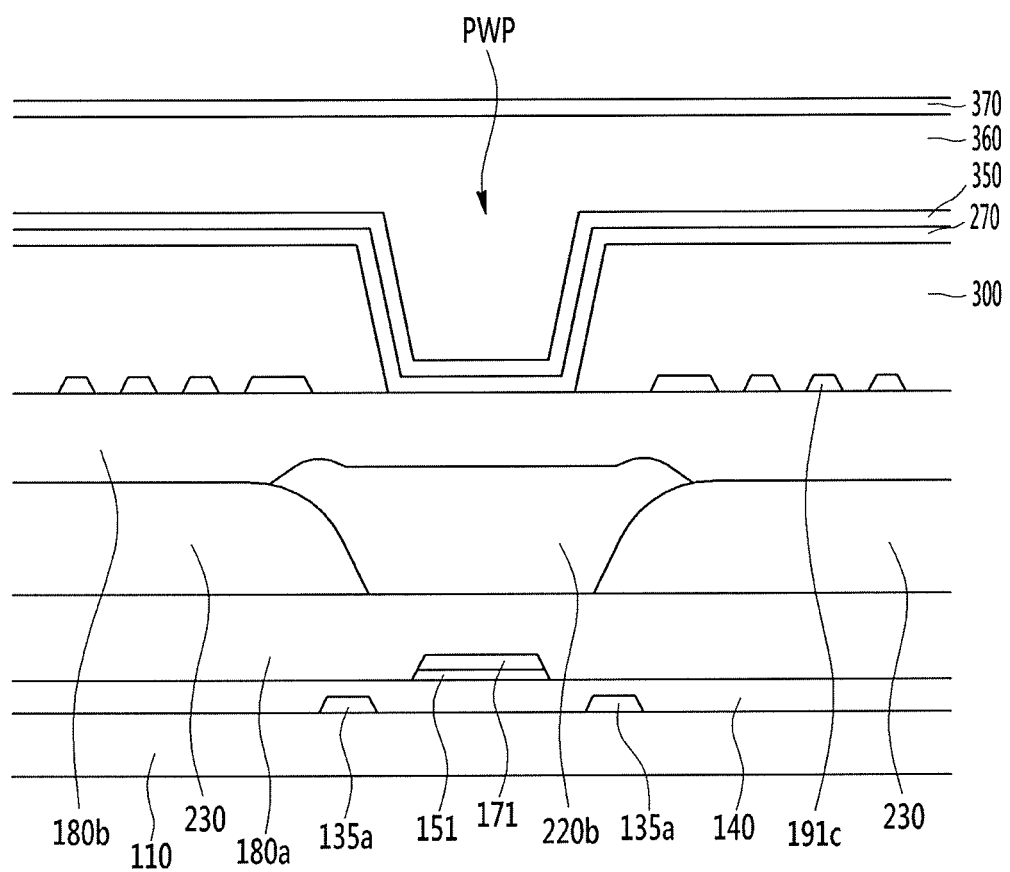

Referring to FIGS. 8 and 9, the upper insulating layer 370 is formed to cover upper portions of the roof layer 360 and the exposed lower insulating layer 350.

Figure 10:
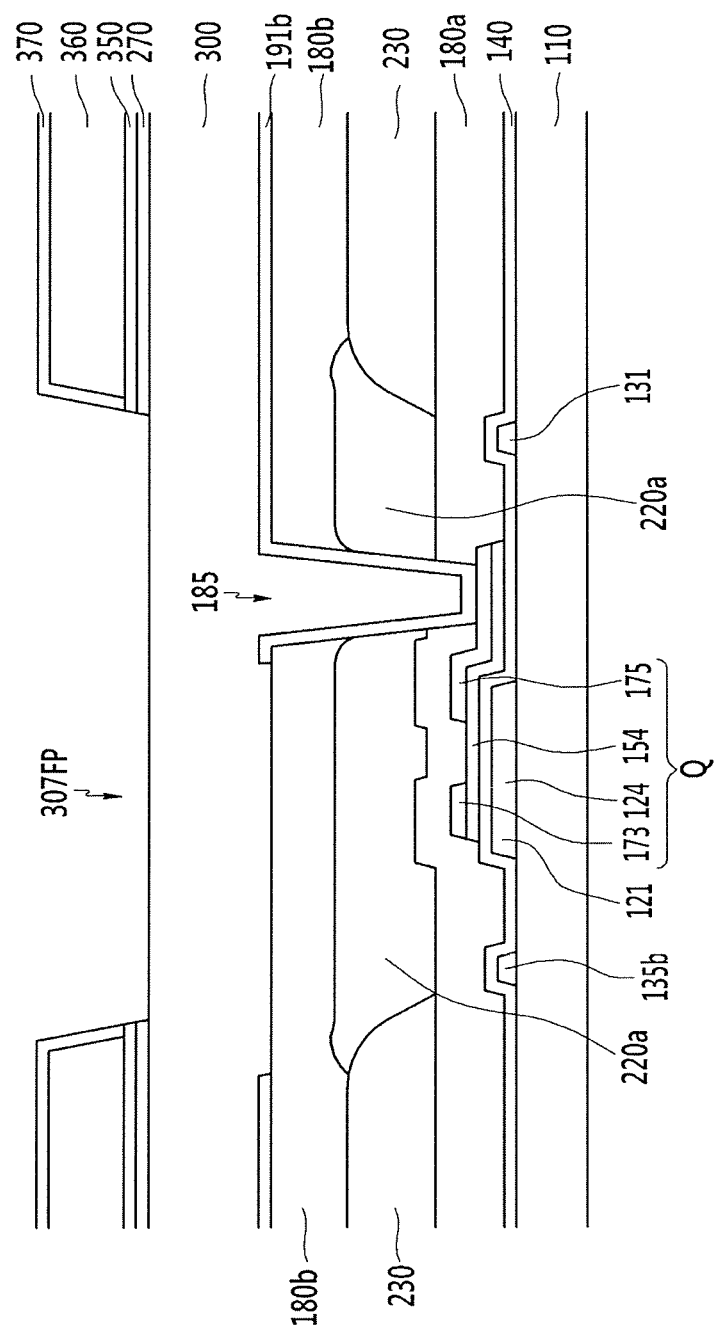

Referring to FIG. 10, the upper insulating layer 370, the lower insulating layer 350, and the common electrode 270 are dry-etched to partially remove the upper insulating layer 370, the lower insulating layer 350, and the common electrode 270, thereby forming the injection hole formation region 307FP. In this case, the upper insulating layer 370 may have a structure that covers a side surface of the roof layer 360, however, exemplary embodiments are not limited thereto. The upper insulating layer 370 covering the side surface of the roof layer 360 may be removed such that the side surface of the roof layer 360 may be externally exposed. As shown in FIG. 10, the roof layer 360 exposes the sacrificial layer 300 in an area corresponding to the injection hole formation region 307FP.

Figure 11:
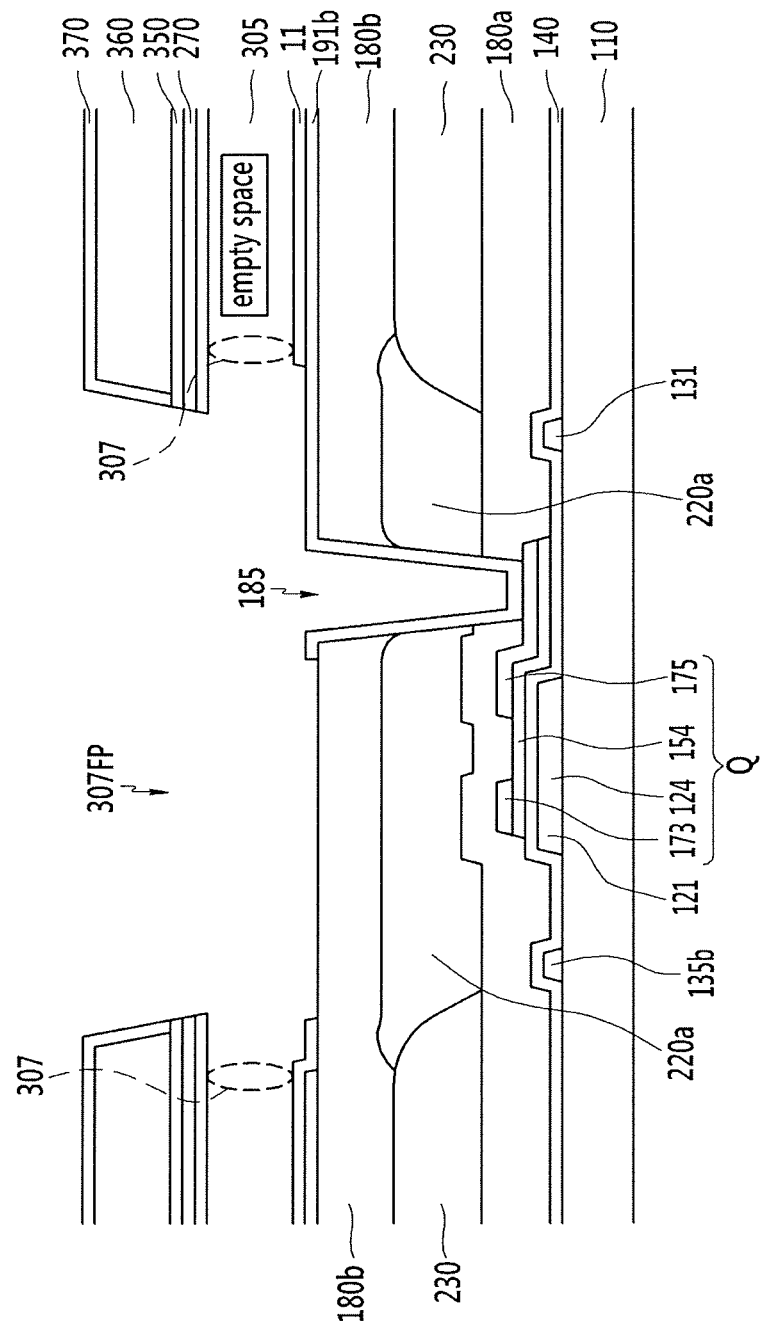
Figure 12:
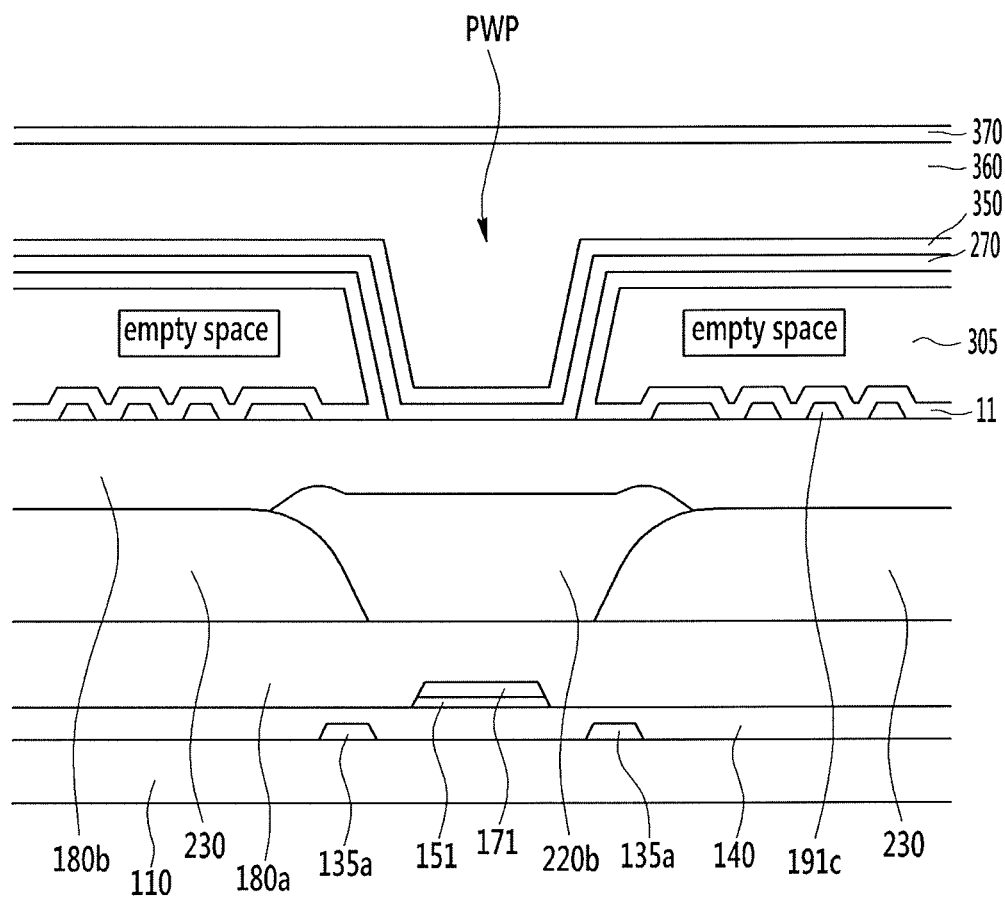

Referring to FIGS. 11 and 12, the sacrificial layer 300 formed at the injection hole formation region 307FP is removed, for example, by an oxygen (O2) ashing process or a wet-etching method. In this case, the microcavities 305 having the injection holes 307 are formed. The microcavities 305 are an empty space according to the removal of the sacrificial layer 300. To maintain the shape of the microcavity 305, a process of hardening the roof layer 360 may be performed by heating.

The alignment layer 11 is formed on the pixel electrode 191 and the common electrode 270 by, for example, injecting an aligning material through the injection holes 307 in the microcavity 305. For example, when an aligning agent containing an alignment material is dripped on the substrate 110 by a spin coating method or an inkjet method, the aligning agent is injected into the microcavity 305 through the injection holes 307 by capillary force. Next, when performing a hardening process, a solution component is evaporated and the alignment material remains at an inner wall of the microcavity 305, thereby forming the alignment layer 11.

Figure 13:
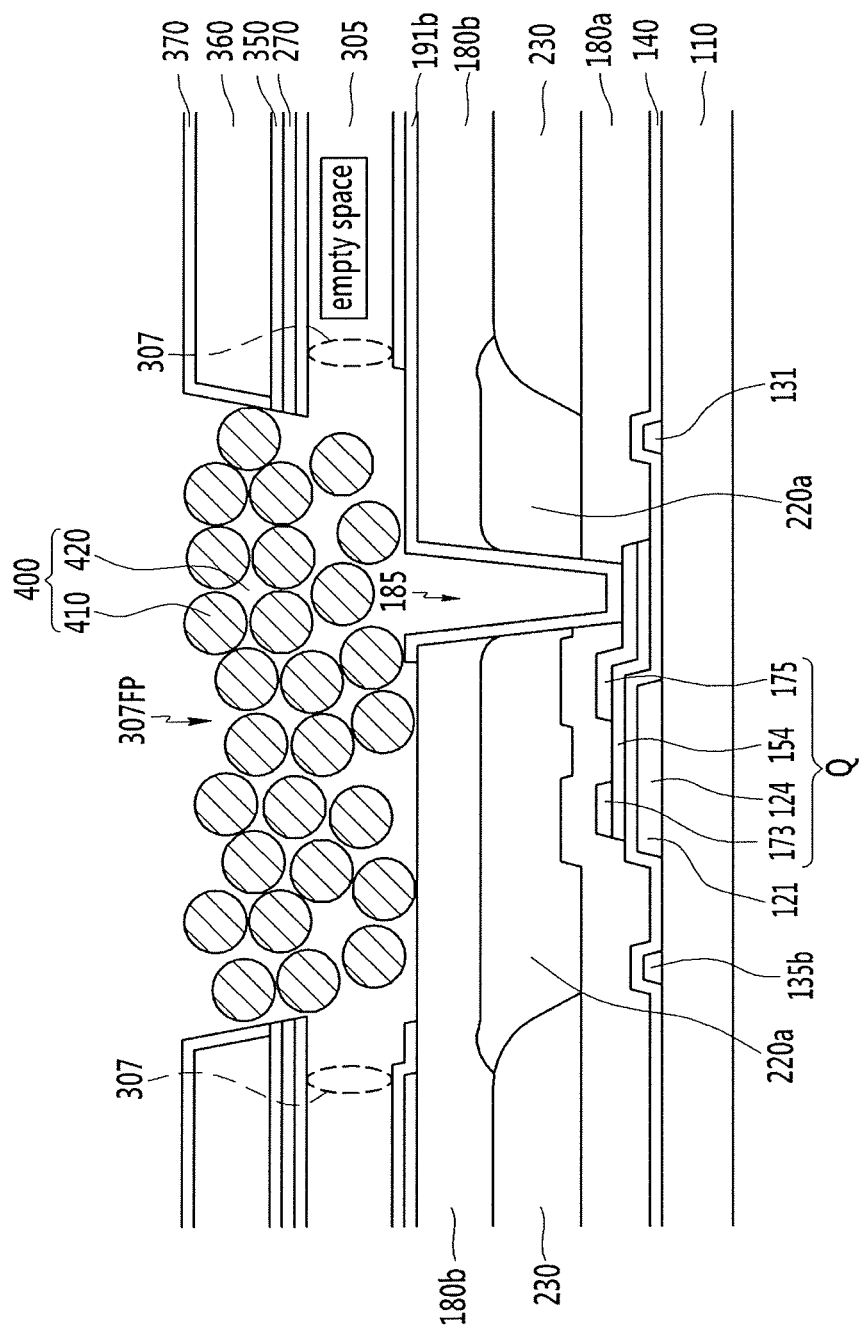

Referring to FIG. 13, the liquid crystal transmission layer 400 is formed at the injection hole formation region 307FP. According to an exemplary embodiment, the liquid crystal transmission layer 400 starts at the second interlayer insulating layer 180b and is formed to be at least higher than the microcavity 305 or the injection hole 307. To form the liquid crystal transmission layer 400, after coating the nanoparticle paste at the injection hole formation region 307FP, a hardening process such as, for example, a heat treatment is performed to evaporate a solution component from the nanoparticle paste. Then, nanoparticles 410 remaining at the injection hole formation region 307FP form the liquid crystal transmission layer 400 with the gaps 420 between the nanoparticles 410. The nanoparticle paste may be formed by mixing the nanoparticles 410 having a diameter less than several tens of micrometers in a liquid such as, for example, ethanol or a binder.

According to an exemplary embodiment, when the nanoparticles 410 of the liquid crystal transmission layer 400 are spheres of substantially the same size, a close packing particle concentration may be about 74%. For example, the liquid crystal transmission layer 400 may have a minimum gap ratio of about 26%. When the injection hole formation region 307FP is filled with only one size nanoparticle to form the liquid crystal transmission layer 400, the packing particle concentration may be above about 52%. In this case, the gap ratio is about 48%. Accordingly, the liquid crystal transmission layer 400 may have a particle concentration of about 52% to about 74%, and a gap ratio of about 26% to about 48%, according to the size of the nanoparticles.

According to an exemplary embodiment, an effective viscosity according to the particle concentration of the liquid crystal transmission layer 400 is:

$$\mu_{eff} = \mu(1 + 2.5\phi)$$

Here, $\mu$ is a pure fluid viscosity, $\phi$ is a particle concentration, and $\mu_{eff}$ is the effective viscosity.

In the above equation, if the particle concentration is not 0, the effective viscosity is higher than the pure fluid viscosity. For example, in the above-described particle concentration of about 52% to about 74%, the viscosity effect of the effective viscosity being increased compared to the pure fluid viscosity by about 2.3 times to about 2.85 times appears. This means that the material has high viscosity, which may make it difficult for the material to pass through the liquid crystal transmission layer 400.

Figure 14:
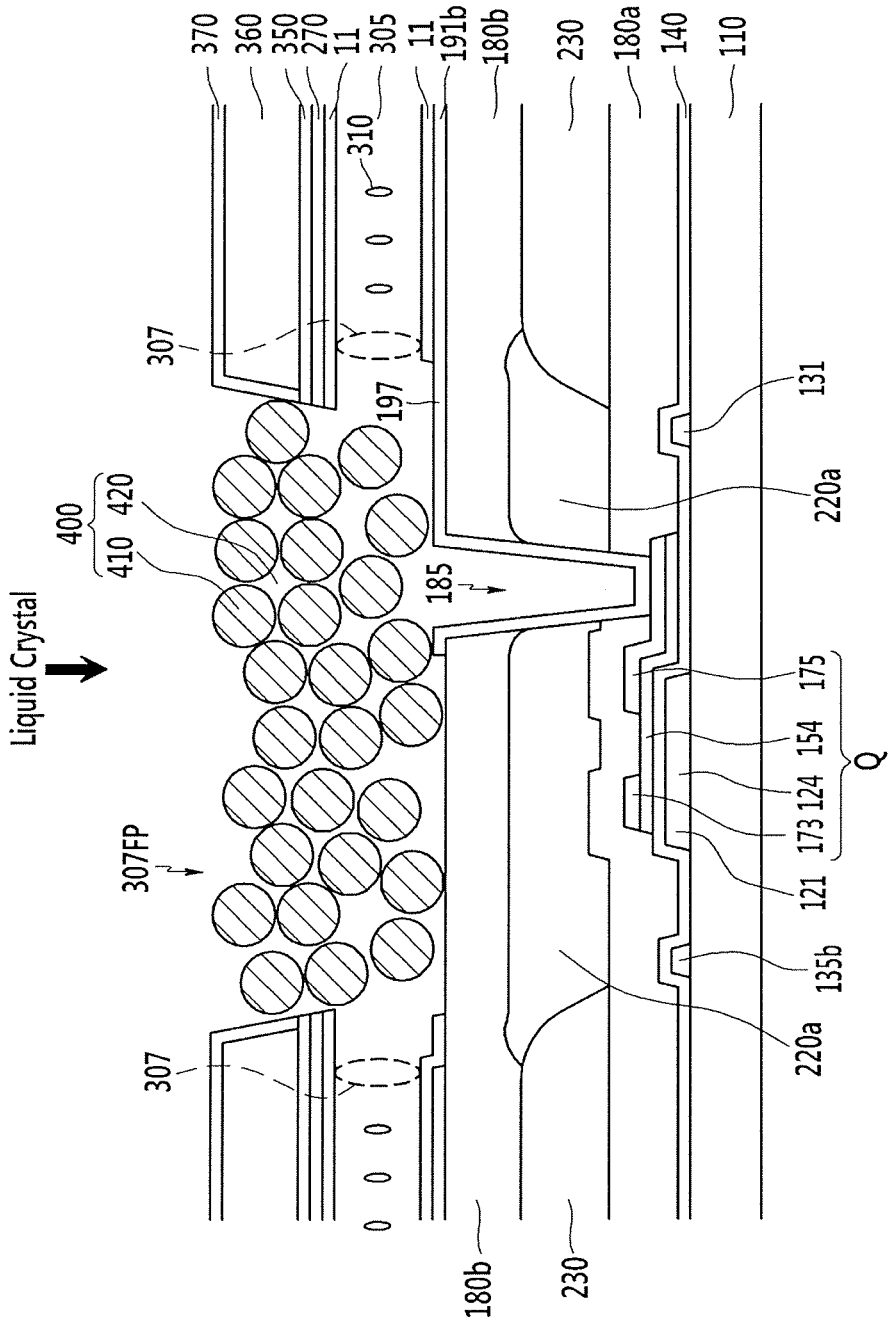
Figure 15:
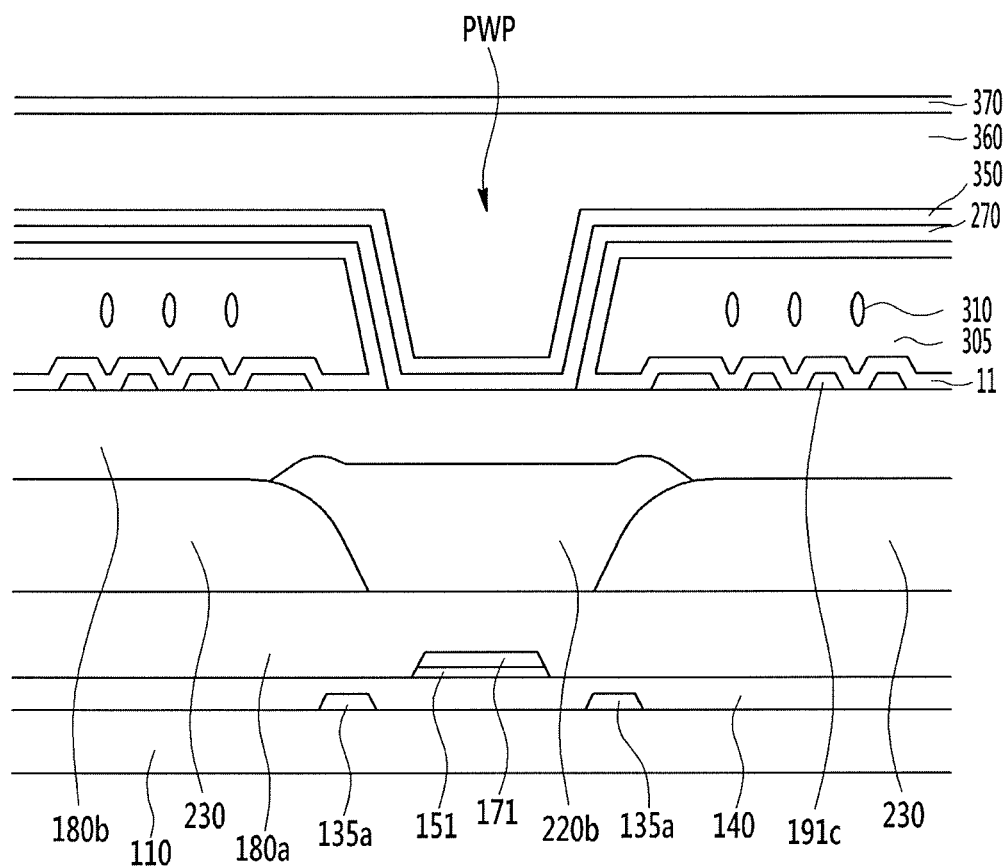

Referring to FIGS. 14 and 15, the liquid crystal layer is formed in the microcavity 305. If the liquid crystal is dripped on the substrate 110 using the inkjet method, the liquid crystal passes through the gaps 420 between the nanoparticles 410 of the liquid crystal transmission layer 400 and is injected into the microcavity 305 through the injection hole 307 connected to the gaps 420. The liquid crystal may have a viscosity of, for example, about 30 cP to about 50 cP. In this case, the effective viscosity of the liquid crystal is increased in the liquid crystal transmission layer 400 by the viscosity effect of the liquid crystal transmission layer 400 increasing the viscosity by about 2.3 times to about 2.85 times. Accordingly, since the injection of the liquid crystal may be difficult or the injection may take a long time, the liquid crystal may be injected by, for example, a vacuum filling process. The vacuum filling process may be performed in a chamber. For example, an object in which the liquid crystal is dripped on the substrate 110 is disposed in the chamber and the inside of the chamber is formed in a vacuum state, so that the air inside the microcavity 305 is discharged from the microcavity 305. Thus, the inside of the microcavity 305 is substantially formed in a vacuum state. Next, if the vacuum state inside the chamber is released, the liquid crystal disposed on the substrate 110 is injected into the microcavity 305.

After forming the liquid crystal layer by injecting the liquid crystal, the capping layer 390 as shown in FIG. 2 is formed to cover the liquid crystal transmission layer 400 on the upper insulating layer 370. The capping layer 390 may be formed by various methods according to the formation material thereof such as, for example, deposition, coating, or film lamination.

When forming the capping layer 390 by coating the liquid capping layer formation material, miscibility with the liquid crystal is controlled by forming the viscosity of the capping layer formation material to be more than about 6000 cP by a mixing phenomenon with the conventional liquid crystal. In this case, the coating speed may be slow because of the high viscosity of the capping layer formation material, which may cause problems with the coating equipment. However, when forming the liquid crystal transmission layer 400 according to an exemplary embodiment of the present invention, since the effective viscosity of the capping layer formation material is greatly increased, it is unlikely that the capping layer formation material will penetrate into the liquid crystal transmission layer 400. If contact with the liquid crystal in the liquid crystal transmission layer 400 occurs, the miscibility with the liquid crystal is suppressed by the increased effective viscosity. For example, to control the miscibility with the liquid crystal, although the capping layer formation material having the lower viscosity than the conventional capping layer formation material by about 2.3 times to about 2.85 times is used in an exemplary embodiment, the same miscibility control effect as with the conventional method may be obtained. For example, when the particle concentration of the liquid crystal transmission layer 400 is about 74%, the capping layer formation material having the viscosity of about 2000 cP has the viscosity effect of about 6000 cP. As a result, according to exemplary embodiments, a selection width of the capping layer formation material is widened and the time after the formation of the capping layer to the hardening may be increased, thereby increasing a process margin.

According to an exemplary embodiment, to prevent the liquid crystal injected in the microcavity 305 from contacting the capping layer formation material, the liquid crystal transmission layer 400 in the injection hole formation region 307FP may be formed starting from the second interlayer insulating layer 180b and being at least higher than the microcavity 305 or the injection hole 307. Since the liquid crystal transmits through the liquid crystal transmission layer 400, but the capping layer formation material does not transmit through the liquid crystal transmission layer 400, the liquid crystal that is injected in the microcavity 305 and remains in the liquid crystal transmission layer 400 may be prevented from contacting the capping layer formation material. However, according to exemplary embodiments, forming the liquid crystal transmission layer 400 with approximately the same height as the roof layer 360 or the upper insulating layer 370 from the second interlayer insulating layer 180b may reduce the possibility of the capping layer 390 or the capping layer formation material contacting the liquid crystal, and may form a flat capping layer 390.

According to exemplary embodiments of the present invention, the liquid crystal transmission layer 400 may be formed by coating a paste including nanoparticles at the injection hole formation region 307FP. The paste may be hardened after it is coated. In addition, according to exemplary embodiments of the present invention, the liquid crystal transmission layer 400 may be formed by coating a mixture of thermally decomposable or dissolvable particles and a transparent oxide to the injection hole formation region 307FP. The particles may be thermally decomposed or dissolved after coating the mixture.

Figure 16:
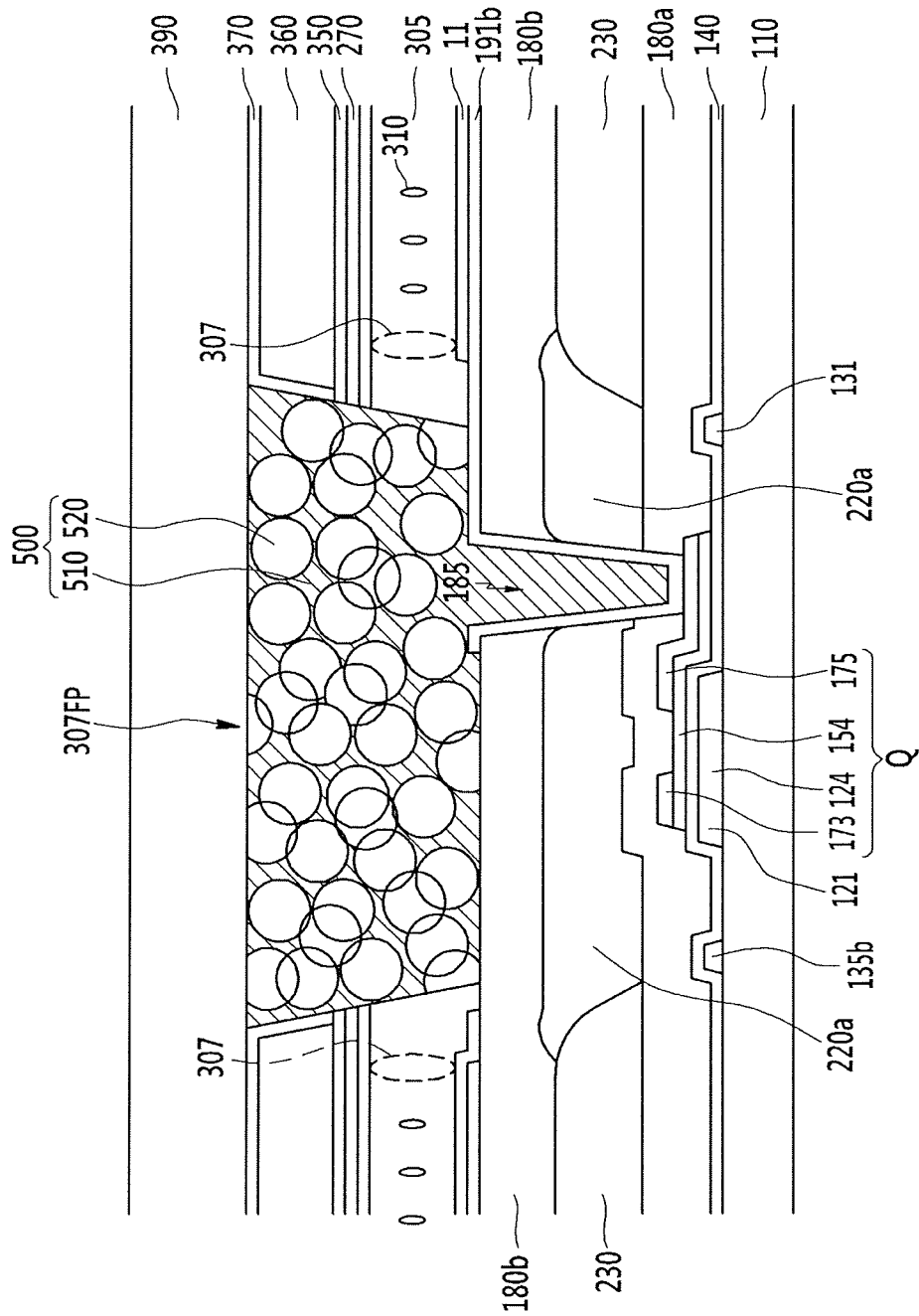
FIG. 16 is a view of a liquid crystal display device according to an exemplary embodiment of the present invention.

FIG. 16 is a view of a liquid crystal display according to an exemplary embodiment of the present invention taken along line II-II of FIG. 1.

Unlike the exemplary embodiment in which the liquid crystal transmission layer 400 is formed of the nanoparticles 410 with the gaps 420 therebetween, as shown in FIG. 2, in the present exemplary embodiment, the liquid crystal transmission layer 500 is formed of a structure 510 with pores 520 formed in the structure 510. For example, the injection hole formation region 307FP is entirely filled with the structure 510, and a plurality of pores 520 exist in the structure 510 in contact with each other.

Referring to the formation of the liquid crystal transmission layer 500, for example, a surfactant may be mixed with a transparent oxide such as a silicon oxide (SiOx) or a zinc oxide (ZnOx) and may be coated thereon. A heat process and a solution process may then be performed to dissolve or decompose the surfactant. Thus, the transparent oxide becomes the structure 510 of the liquid crystal transmission layer 500, and the space in which the surfactant in the structure 510 is decomposed or dissolved to be removed becomes the pores 520. These pores 520 are connected from the upper portion of the liquid crystal transmission layer 500 to the injection hole 307 of the microcavity 305 such that the liquid crystal may be injected to the microcavity 305 through the pores 520.

A negative or positive ion of the surfactant may be used, as well as the surfactant, and various particles that may be decomposed by the heating or dissolution in the solvent may be used to form the pores 520 in the structure 510. The effective viscosity of the liquid crystal transmission layer 500 may be increased by controlling the size of the pores 520 and the pore ratio through the size and the density of the particles such as the surfactant.

Other characteristics such as, for example, the height of the liquid crystal transmission layer 500, may be the same as those described above in relation to the liquid crystal transmission layer 400 in the exemplary embodiment described with reference to FIGS. 1 to 3. The liquid crystal transmission layer 500 may be formed after forming the alignment layer 11 and before forming the liquid crystal layer.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A liquid crystal display, comprising:
a substrate;
a thin film transistor disposed on the substrate;
a pixel electrode disposed on and connected to the thin film transistor;
a liquid crystal layer disposed in a first microcavity, wherein the first microcavity is disposed on the pixel electrode and comprises an injection hole;
a roof layer disposed on the first microcavity;
an injection hole formation region disposed between the first microcavity and a second microcavity adjacent to the first microcavity; and
a liquid crystal transmission layer disposed in the injection hole formation region.

2. The liquid crystal display of claim 1, further comprising:
a capping layer disposed on the liquid crystal transmission layer.

3. The liquid crystal display of claim 2, wherein the liquid crystal transmission layer comprises a plurality of nanoparticles and a plurality of gaps formed between the plurality of nanoparticles.

4. The liquid crystal display of claim 3, wherein the liquid crystal transmission layer has a gap ratio in a range of about 26% to about 48%.

5. The liquid crystal display of claim 1, wherein a height of the liquid crystal transmission layer is greater than a height of the first microcavity.

6. The liquid crystal display of claim 5, wherein an upper surface of the liquid crystal transmission layer is substantially aligned with an upper surface of the roof layer.

7. The liquid crystal display of claim 1, wherein the liquid crystal transmission layer comprises a plurality of pores.

8. The liquid crystal display of claim 7, wherein the liquid crystal transmission layer comprises a silicon oxide or a zinc oxide.

9. The liquid crystal display of claim 1, further comprising a common electrode configured to form an electric field with the pixel electrode.

10. A method of manufacturing a liquid crystal display, comprising:
forming a thin film transistor on a substrate;
forming a pixel electrode connected to the thin film transistor;
forming a sacrificial layer on the pixel electrode;
forming a roof layer on the sacrificial layer, wherein the roof layer exposes the sacrificial layer in an area corresponding to an injection hole formation region;
removing the sacrificial layer to form a first microcavity having an injection hole;
forming a liquid crystal transmission layer in the injection hole formation region between the first microcavity and a second microcavity adjacent to the first microcavity; and
injecting a liquid crystal through the liquid crystal transmission layer and the injection hole to form a liquid crystal layer in the first microcavity.

11. The method of claim 10, further comprising:
forming a capping layer on the liquid crystal transmission layer after forming the liquid crystal layer.

12. The method of claim 11, wherein forming the liquid crystal transmission layer comprises coating a paste including nanoparticles at the injection hole formation region.

13. The method of claim 12, wherein forming the liquid crystal transmission layer comprises hardening the paste after coating the paste.

14. The method of claim 11, wherein forming the liquid crystal transmission layer comprises coating a mixture of thermally decomposable or dissolvable particles and a transparent oxide to the injection hole formation region.

15. The method of claim 14, wherein forming the liquid crystal transmission layer comprises thermally decomposing or dissolving the particles after coating the mixture.

16. The method of claim 10, wherein injecting the liquid crystal is performed using a vacuum filling process.

17. The method of claim 10, further comprising:
forming an alignment layer at an inner surface of the first microcavity before forming the liquid crystal transmission layer.

18. The method of claim 10, wherein an upper surface of the liquid crystal transmission layer is substantially aligned with an upper surface of the roof layer.

19. A method of manufacturing a liquid crystal display, comprising:
forming a thin film transistor on a substrate;
forming a pixel electrode connected to the thin film transistor;
forming a first microcavity having an injection hole on the pixel electrode;
forming a liquid crystal transmission layer in an area between the first microcavity and a second microcavity adjacent to the first microcavity; and
injecting a liquid crystal through the liquid crystal transmission layer and the injection hole to form a liquid crystal layer in the first microcavity.

20. The method of claim 19, further comprising:
forming a capping layer on the liquid crystal transmission layer after forming the liquid crystal layer.

* * * * *